United States Patent
Wang et al.

(10) Patent No.: US 6,227,555 B1
(45) Date of Patent: May 8, 2001

(54) TOP-PRESS STEERING DEVICE FOR A SKATEBOARD

(76) Inventors: Leao Wang; Peter Wu, both of No 1, Lane 233, Sec. 2, Charng Long Rd., Taiping (TW), 411

( * ) Notice: Subject to any disclaimer, the term of this patent is extended or adjusted under 35 U.S.C. 154(b) by 0 days.

(21) Appl. No.: 09/517,334

(22) Filed: Mar. 2, 2000

(51) Int. Cl.[7] ................................................. A63C 17/02
(52) U.S. Cl. ..................................... 280/87.042; 280/267
(58) Field of Search ............................. 280/11.19, 14.28, 280/87.01, 87.041, 87.042, 87.043, 87.05, 267, 269, 11.28

(56) References Cited

U.S. PATENT DOCUMENTS

| | | | |
|---|---|---|---|
| 3,442,528 | * 5/1969 | Rademacher | 280/87.01 |
| 4,274,647 | * 6/1981 | Drake, Jr. | 280/87.042 |
| 4,708,353 | * 11/1987 | Evequoz | 280/16 |
| 5,165,711 | * 11/1992 | Tsai | 280/87.041 |
| 5,954,349 | * 9/1999 | Rutzel | 280/87.041 |
| 5,975,229 | * 11/1999 | Hosoda | 180/181 |
| 5,997,018 | * 12/1999 | Lee | 280/87.042 |

* cited by examiner

*Primary Examiner*—Brian L. Johnson
*Assistant Examiner*—Bridget Avery
(74) *Attorney, Agent, or Firm*—Kuo-Hsiung Chiu

(57) ABSTRACT

A top-press steering device for a skateboard primarily includes a front supporting bar. A height-adjustable handle in cooperation with an adjusting knob is inserted into the top of the front supporting bar. The front supporting bar is attached to a main frame while a deck is hinged with the main frame. Thereafter, one end of the main frame is hinged with a first wheel assembly while the other end thereof is hinged a locating member. In addition, the lower end of the locating member is hinged with an axle shaft of a second wheel assembly. When the front supporting bar is turned by the handle to the right and the left direction or when the deck is inclined to the side by making use of the shift of the center of gravity of the body, the main frame will also be made in a sloping state with the deck, and wherein the top-press members disposed at the bottom of the deck press against the axle shaft of the second wheel assembly to create a direction-turning effect so that the expected goal of turning the wheels can be reached.

1 Claim, 5 Drawing Sheets

TOP-PRESS STEERING DEVICE FOR A SKATEBOARD

BACKGROUND OF THE INVENTION

1. Field of the Invention

The present invention relates to a side-sloping steering device for a skateboard, and more particularly to a device which makes use of the sloping of the main frame to reach the direction-turning effect of the wheels.

2. Description of the Prior Art

The steering device of a broadly used conventional skateboard, as shown in FIG. 6, is structurally the same to that of bicycles or cars, that is, they make use of turning the handle or the steering wheel to enable the coupled wheel assembly to carry out a direct direction-turning movement. Though this is a very common technique, it's uneasy to hold the handgrip 10 with one hand in turning the direction, especially for the beginner or the user unfamiliar therewith, because it is an exercise apparatus (or called toy) with small volume. An excessive or insufficient turning movement is easily caused.

SUMMARY OF THE INVENTION

It is a main object of the present invention to provide a side-sloping steering device for a skateboard which makes use of the right or left shift of the steering handle or the body gravity of the users to reach a simultaneous side-sloping effect so that the wheels can be easily turned.

BRIEF DESCRIPTION OF THE DRAWINGS

The drawings disclose illustrative an embodiment of the present invention which serve to exemplify the various advantages and objects hereof, and are as follows.

DETAILED DESCRIPTION OF THE PREFERRED EMBODIMENT

Figure 1:
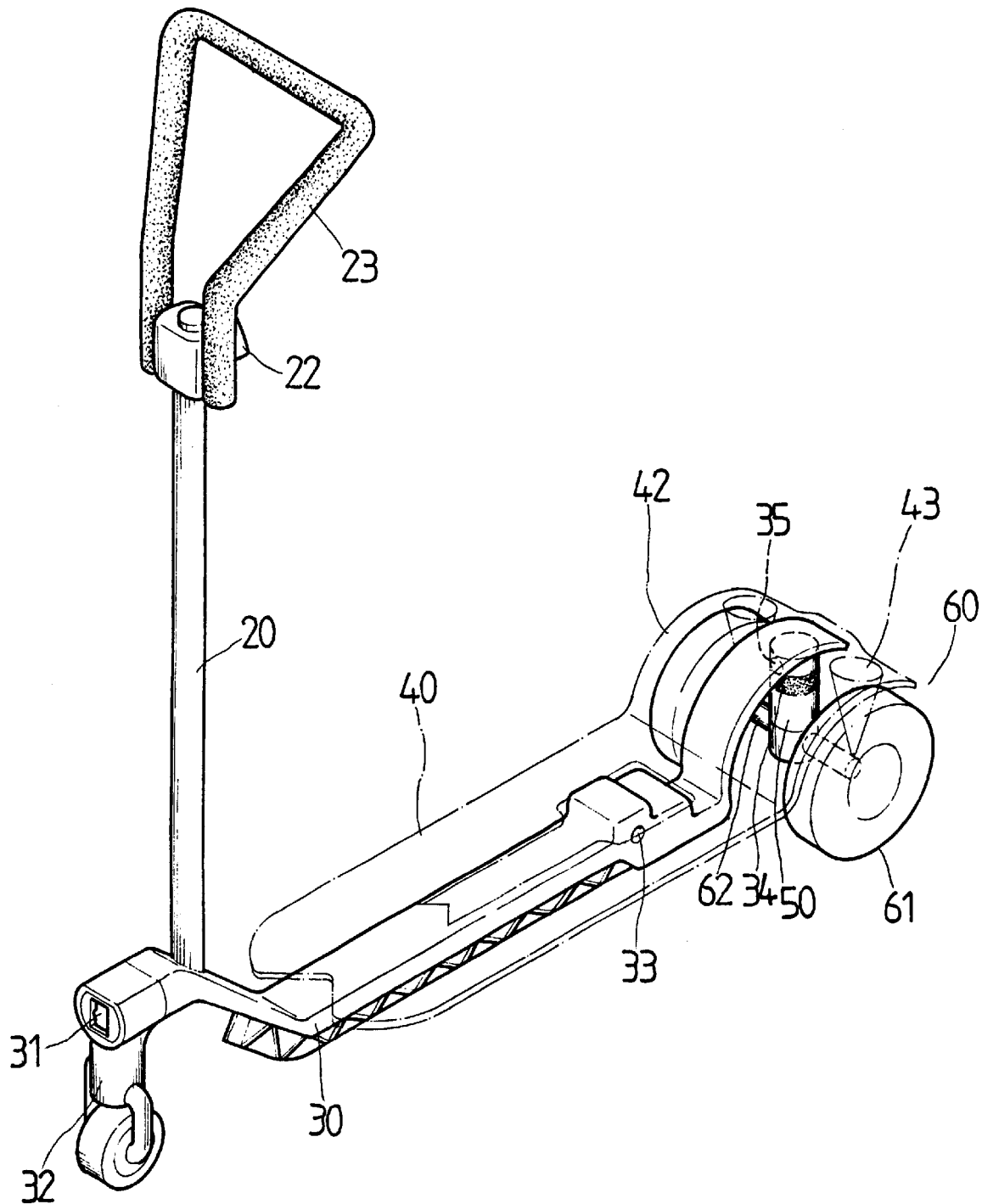
FIG. 1 is a perspective assembly view of a preferred embodiment of the present invention.
Figure 2:
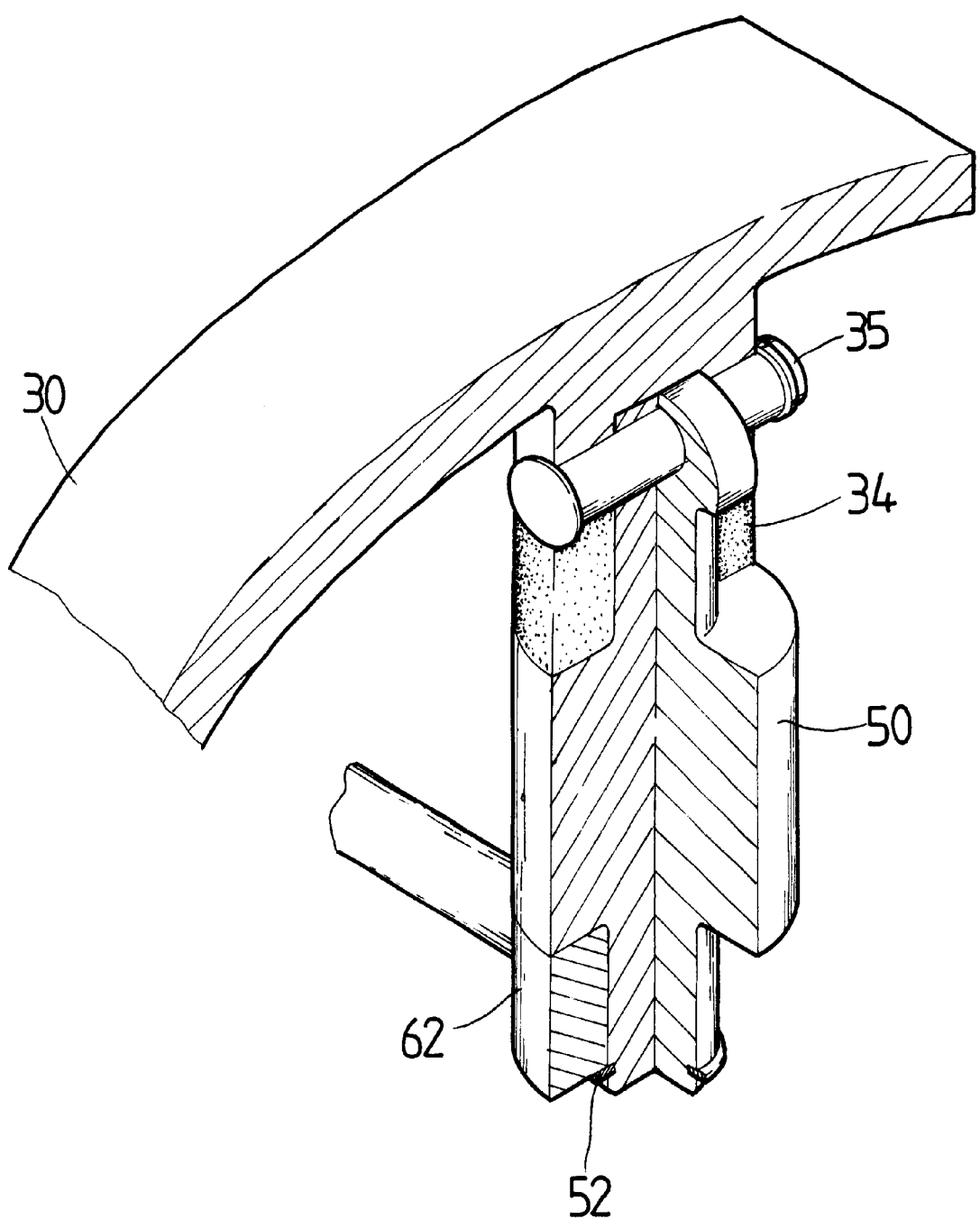
FIG. 2 is a partial cutaway view of a steering device in accordance with FIG. 1.
Figure 3:
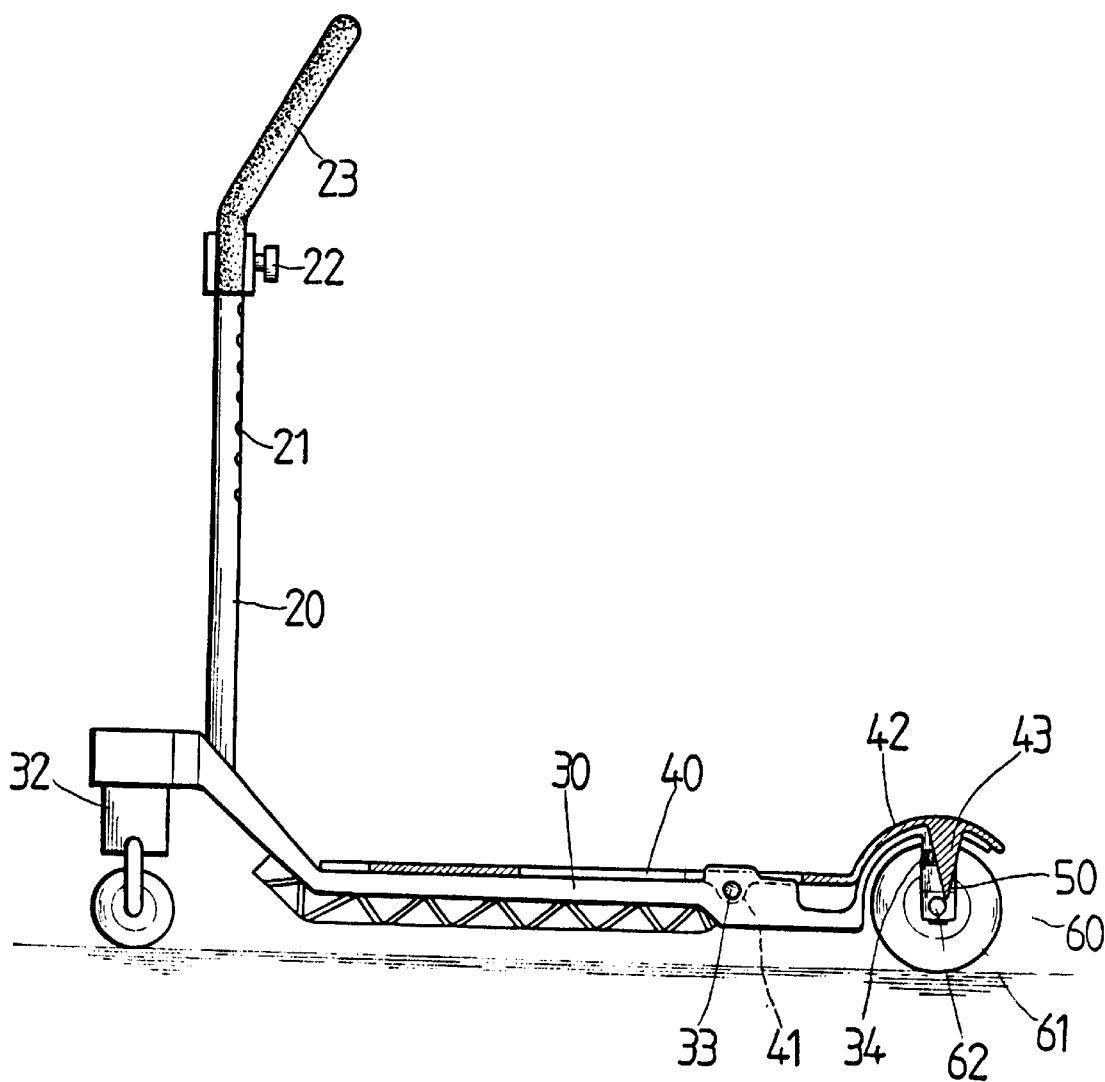
FIG. 3 is a side view and a partial cutaway view of the skateboard in accordance with FIG. 1.
Figure 5:
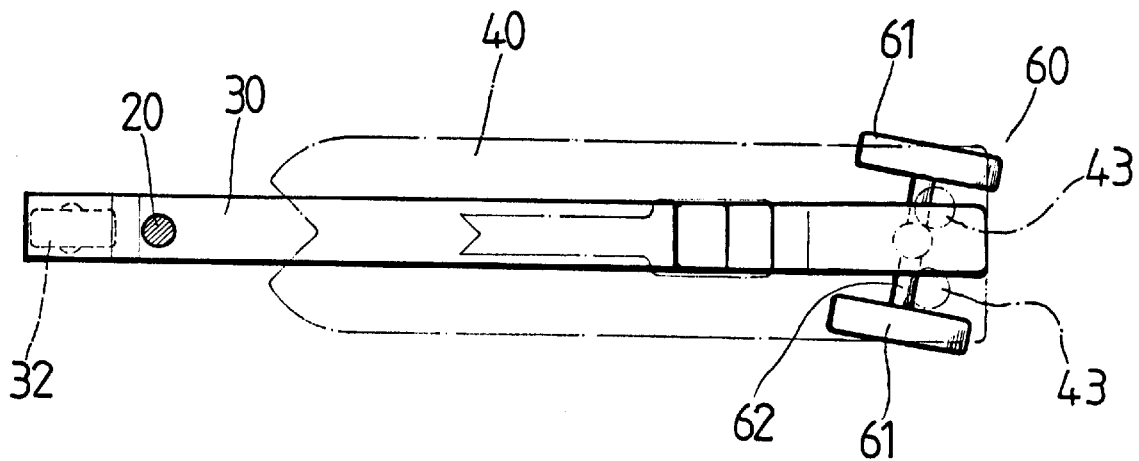
FIG. 5 is schematic action drawing of a plane view of the present invention.
Figure 4:
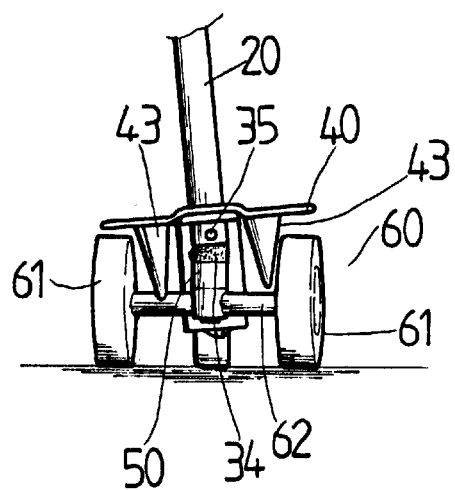
FIG. 4 is a schematic action drawing of a rear view the present invention.
Figure 6:
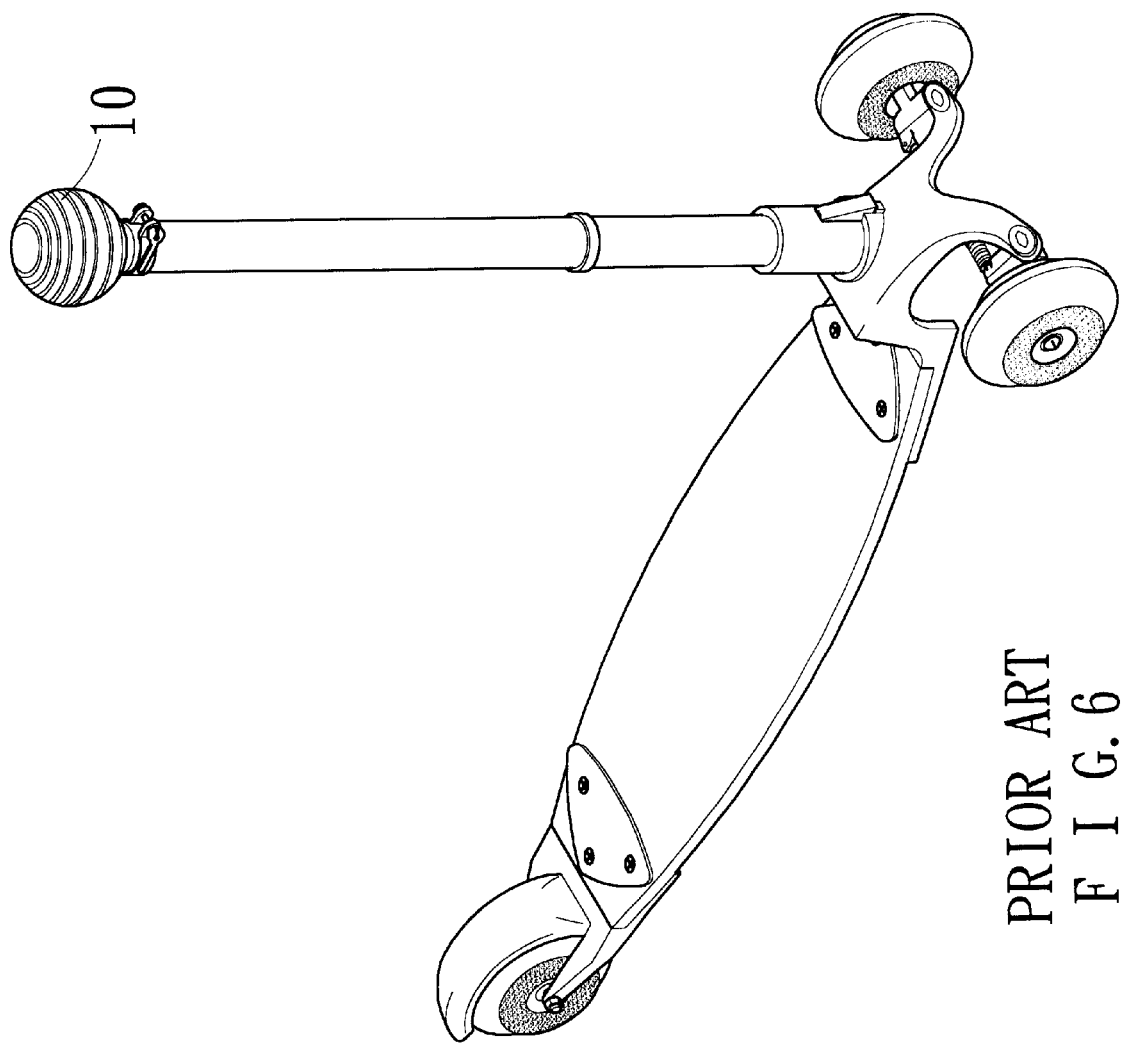
FIG. 6 is a perspective view of a conventional skateboard.

First of all, referring to FIGS. 1, 2 and 3, they show a preferred embodiment of the present invention which includes the following basic components:

a front supporting bar 20 having a plurality of through holes 21 for fastening a handle 23 and adjusting the height thereof in cooperation with a knob 22, a main frame 30 being coupled at the bottom end thereof;

a main frame 30 having a pivot 31 at one end thereof for connecting with a first wheel assembly 32, said main frame 30 and a deck 40 being hinged by means of a through shaft 33 at a certain position, said main frame 30 being hinged with a locating member 50 at the other end thereof by means of a packing ring 34 and another through shaft 35;

a deck 40 placed upon said main frame 30 and hinged with said main frame 30 by means of an ear 41, a tail 42 being raised and covering the top of a second wheel assembly 60 at the corresponding position thereof, a proper clearance being kept between said tail 42 and said second wheel assembly 60, said deck 40 at two sides of said locating member 50 having two downward extending conic top-press members 43 which can be in contact with an axle shaft 62 of said second wheel assembly 60 at two sides thereof;

a locating member 50 being hinged with said main frame 30 at the top end thereof by means of said packing ring 34 and said through shaft 35 while the bottom end thereof being hinged with said axle shaft 62 of said second wheel assembly 60;

After assembly of the foregoing components, as shown in FIGS. 4 and 5, when the front supporting bar 20 is turned by the handle 23 to the right and the left direction or when the deck 40 is inclined to the side by making use of the shift of the center of gravity of the body, the main frame 30 will also be made in a sloping state with the deck 40. Thereafter, the top-press members 43 disposed at the bottom of the deck 40 press against the axle shaft 62 of the second wheel assembly 60 so that the hinged part between the axle shaft 62 and the locating member 52 serves as pivot to create a direction-turning effect and the expected goal of turning the wheels 61 can be reached.

The packing ring 34 disposed between the locating member 50 and the main frame 30 is used to keep the horizontal position of the main frame. In addition, a resilient force can be produced when it is pressed while the main frame will return when the external force disappears.

Of course, the foregoing steering device (including the top-press member 43, the locating member 50, the packing ring 34, the axle shaft 62, etc.) in the present invention can be mounted on the wheel assembly in front of the deck or on both front and rear wheel assembly.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claim.

What is claimed is:

1. A skateboard having a top press steering device further comprising a first supporting bar, a height-adjusting handle attached to an adjusting knob, said adjusting knob being inserted onto the top of the front supporting bar, said front supporting bar being attached to a main frame and a deck being hinged with said main frame; one end of said main frame being connected with a first wheel assembly while the other end thereof is hinged to a locating member; the lower end of said locating member housing therein an axle shaft of a second wheel assembly, wherein when said front supporting bar is turned by said handle to the right and the left direction or when said deck is tilted, said main frame will tilt with said deck causing top-press members mounted to the bottom of said deck to press against said axle shaft of said second wheel assembly to steer said skateboard.

* * * * *